US009422492B2

(12) United States Patent
Boissonnet et al.

(10) Patent No.: US 9,422,492 B2
(45) Date of Patent: Aug. 23, 2016

(54) PROCESS FOR THE CONVERSION OF A FEED CONTAINING BIOMASS FOR THE PRODUCTION OF HYDROCARBONS, BY FISCHER-TROPSCH SYNTHESIS

(71) Applicants: IFP Energies nouvelles, Rueil-Malmaison (FR); AXENS, Rueil-Malmaison (FR); BIONEXT, Venette (FR); COMMISSARIAT A L'ENERGIE ATOMIQUE ET AUX ENERGIES ALTERNATIVES, Paris (FR); AVRIL, Paris (FR); THYSSENKRUPP INDUSTRIAL SOLUTIONS AG, Essen (DE); Total Raffinage Chimie, Courbevoie (FR)

(72) Inventors: Guillaume Boissonnet, Grenoble (FR); Michael Hecquet, Octeville sur Mer (FR); Priscilla Avenier, Grenoble (FR); Laurent Bournay, Chaussan (FR); David Chiche, Lyons (FR); Jean-Philippe Heraud, Saint Pierre de Chandieu (FR); Anne Claire Lucquin, Saint Maurice L'exil (FR); Norbert Ullrich, Essen (DE); Stéphane Fedou, Paris (FR); Julien Rousseau, Paris (FR); Raphael Lemaire, Paris (FR); Jean-Christophe Viguie, Lyons (FR)

(73) Assignees: IFP ENERGIES NOUVELLES, Rueil-Malmaison (FR); AXENS, Rueil-Malmaison (FR); BIONEXT, Venette (FR); COMMISSARIAT A L'ENERGIE ATOMIQUE ET AUX ENERGIES ALTERNATIVES, Paris (FR); AVRIL, Paris (FR); THYSSENKRUPP INDUSTRIAL SOLUTIONS AG, Essen (DE); TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 14/439,328

(22) PCT Filed: Oct. 30, 2013

(86) PCT No.: PCT/FR2013/052600
§ 371 (c)(1),
(2) Date: Apr. 29, 2015

(87) PCT Pub. No.: WO2014/068253
PCT Pub. Date: May 8, 2014

(65) Prior Publication Data
US 2015/0275112 A1    Oct. 1, 2015

(30) Foreign Application Priority Data
Oct. 31, 2012    (FR) ...................... 12 02944

(51) Int. Cl.
*C07C 27/00* (2006.01)
*C10K 3/04* (2006.01)
(Continued)

(52) U.S. Cl.
CPC .................. *C10K 3/04* (2013.01); *B01J 20/06* (2013.01); *B01J 20/18* (2013.01); *B01J 20/20* (2013.01); *C10G 2/30* (2013.01); *C10G 2/32* (2013.01); *C10G 45/00* (2013.01); *C10G 47/00* (2013.01); *C10J 3/00* (2013.01); *C10J 3/466* (2013.01); *C10J 3/485* (2013.01); *C10K 1/004* (2013.01); *C10K 1/005* (2013.01); *C10K 1/006* (2013.01); *C10K 1/007* (2013.01); *C10K 1/101* (2013.01); *C10K 1/20* (2013.01); *C10K 1/34* (2013.01); *C10K 3/06* (2013.01); *C10L 9/083* (2013.01); *B01J 2220/603* (2013.01); *C10G 2300/1011* (2013.01); *C10J 2200/09* (2013.01); *C10J 2300/0906* (2013.01); *C10J 2300/0909* (2013.01); *C10J 2300/0916* (2013.01); *C10J2300/0959* (2013.01); *C10J 2300/1659* (2013.01); *C10J 2300/1846* (2013.01); *Y02E 50/15* (2013.01); *Y02E 50/32* (2013.01); *Y02P 20/145* (2015.11); *Y02P 30/10* (2015.11); *Y02P 30/20* (2015.11)
(Continued)

(58) Field of Classification Search
CPC ............ C10K 3/04; C10K 3/06; C10K 1/34; C10K 1/20; C10K 1/004; C10G 45/00; C10G 47/00; C10G 2/32; C10J 3/46
USPC .................................... 518/700, 702
See application file for complete search history.

(56) References Cited

U.S. PATENT DOCUMENTS

2006/0233687 A1    10/2006  Hojlund Nielsen
2009/0013603 A1*    1/2009  Rolland ................... C10J 3/466
                                                                48/209

(Continued)

FOREIGN PATENT DOCUMENTS

| FR | 2925915 A1 | 7/2009 |
| WO | 0074838 A1 | 12/2000 |
| WO | 2007134075 A2 | 11/2007 |

OTHER PUBLICATIONS

International Search report dated Jan. 2, 2014 issued in corresponding to PCT/FR2013/052600 application (pp. 1-2).

*Primary Examiner* — Jafar Parsa
(74) *Attorney, Agent, or Firm* — Millen, White, Zelano, Branigan, P.C.

(57) ABSTRACT

The present invention concerns an integrated process for the production of liquid hydrocarbons starting from a feed containing at least one fraction of biomass and optionally at least one fraction of another feed, said process comprising at least one pre-treatment step, a gasification step, a step for conditioning synthesis gas, a water scrubbing step, a step for eliminating acid gases, a final purification step, and a catalytic Fischer-Tropsch synthesis reaction step.

19 Claims, 5 Drawing Sheets

(51) Int. Cl.
| | |
|---|---|
| *C10K 1/00* | (2006.01) |
| *C10J 3/00* | (2006.01) |
| *C10K 1/10* | (2006.01) |
| *C10K 1/20* | (2006.01) |
| *C10K 1/34* | (2006.01) |
| *C10K 3/06* | (2006.01) |
| *C10G 2/00* | (2006.01) |
| *C10J 3/46* | (2006.01) |
| *C10L 9/08* | (2006.01) |
| *B01J 20/06* | (2006.01) |
| *B01J 20/18* | (2006.01) |
| *B01J 20/20* | (2006.01) |
| *C10G 45/00* | (2006.01) |
| *C10G 47/00* | (2006.01) |
| *C10J 3/48* | (2006.01) |

(56) References Cited

U.S. PATENT DOCUMENTS

2009/0019767 A1\* 1/2009 Abughazaleh ............ C01B 3/16
48/61
2010/0204533 A1\* 8/2010 Herold ...................... C01B 3/56
585/733
2011/0314736 A1  12/2011 Crespin \* cited by examiner

PROCESS FOR THE CONVERSION OF A FEED CONTAINING BIOMASS FOR THE PRODUCTION OF HYDROCARBONS, BY FISCHER-TROPSCH SYNTHESIS

FIELD OF THE INVENTION

The present invention relates to upgrading biomass, typically for the production of liquid hydrocarbons, biofuels and optionally the production of petrochemical bases and/or chemical bases and/or hydrogen.

More particularly, the present invention relates to an integrated process for the conversion of a feed containing at least one fraction of biomass with a view to the production of synthesis hydrocarbons by the Fischer-Tropsch reaction, in particular high quality LPG (Liquefied Petroleum Gas), naphtha, gasoline, kerosene and diesel fractions or lubricant bases.

PRIOR ART

A large number of patents describe production lines for synthesizing hydrocarbons by Fischer-Tropsch synthesis which are frequently associated with steps for hydrotreatment and isomerization of the hydrocarbon cuts obtained from this synthesis.

One of the major problems encountered by the skilled person, more particularly during treatment of a feed comprising biomass, is that the biomass contains very large quantities of halogenated compounds. The halogenated compounds present in the synthesis gas may cause accelerated corrosion of the facilities in which they are encountered. These halogenated impurities are also susceptible of poisoning the catalysts employed in Fischer-Tropsch synthesis processes, but also the catalysts involved in the reaction for the conversion of carbon monoxide using steam, also known as the Water Gas Shift reaction.

Other problems encountered by the skilled person in the field of the invention concern the improvement of the production yields and energetic and economic performances of the production line on an industrial scale, while respecting ever more severe environmental constraints.

U.S. Pat. No. 7,741,377 describes a process for the production of paraffinic hydrocarbons by Fischer-Tropsch synthesis from a feed of carbonaceous solids, using a gasifier which contains integrated cooling equipment for cooling the synthesis gas obtained from the gasifier to a temperature in the range 500° C. to 900° C. by injecting a gaseous or liquid cooling agent, followed by cooling said synthesis gas to a temperature below 500° C. by direct contact with water. That patent also describes a water gas shift step carried out on at least a portion of the purified synthesis gas stream. U.S. Pat. No. 7,741,377 teaches that the portion of the synthesis gas stream which does not undergo the water gas shift reaction is optionally scrubbed with water.

Patent application WO 2008/113766 describes a process for the production of hydrocarbons by Fischer-Tropsch synthesis, consisting of a first step for conversion of a stream of gas comprising methane by partial oxidation into a first mixture of hydrogen and carbon monoxide ($H_2$+CO); at the same time, a step for conversion of a stream of solid or liquid biomass by partial oxidation to form a second $H_2$+CO mixture; and a water gas shift reaction step carried out on said second mixture before the Fischer-Tropsch synthesis step proper. Patent application WO 2008/113766 discloses that the first mixture of hydrogen and carbon monoxide may be combined with the second mixture of hydrogen and carbon monoxide obtained from the water gas shift reaction before the Fischer-Tropsch synthesis step.

In the case of the present invention, the Applicant proposes a novel process which presents optimized integration of the various steps in order to obtain improved production yields and better energetic and economic performances (energy efficiency, production costs, etc.), while complying with environmental constraints such as the emissions of greenhouse gases the thresholds for which are becoming ever more constrained. The process of the invention integrates in particular into the process line a step for fractionation of the synthesis gas obtained from a gasifier into at least two effluents, a first portion and a complementary portion, in which said first portion undergoes a step for elimination of halogenated compounds, in particular chlorine, on at least one appropriate guard bed before being sent to a water gas shift step; and said complementary portion undergoes a step for catalytic hydrolysis of COS and HCN before a step for recombination of the two treated effluents.

BRIEF DESCRIPTION OF THE INVENTION

The present invention concerns an integrated process for the production of liquid hydrocarbons from a feed containing at least one fraction of biomass and optionally at least one fraction of another feed, said process comprising at least the following steps:

a) a step for pre-treatment of the biomass fraction and optionally of the other fraction or fractions, comprising at least one of the operations a1), a2), a4):
  a1) drying,
  a2) torrefaction,
  a4) grinding,
b) an optional step for combining the pre-treated biomass fraction and the other fraction or fractions of the feed, which may or may not have been pre-treated,
c) a step for gasification of the effluent obtained from step b) and/or of the pre-treated fraction obtained from step a) and optionally of at least one fraction of another feed introduced directly into the gasification step in an entrained flow reactor,
d) a step for conditioning synthesis gas obtained from step c), comprising:
  a step d1) for scrubbing with water and for fractionating said synthesis gas into at least two effluents: a first portion and a complementary portion,
  a step d2) for eliminating halogenated compounds by passing said first portion through at least one suitable guard bed,
  a water gas shift step d3) carried out on the effluent obtained from step d2),
  a step d4) for catalytic hydrolysis of the COS and HCN compounds contained in said complementary portion of the effluent obtained from step d1) into $H_2S$ and $NH_3$,
e) a step for recombination of at least one fraction of each of the effluents obtained from steps d3) and d4),
f) a step for scrubbing the recombined effluent obtained from step e) with water in order to eliminate impurities such as $NH_3$ and HCl,
g) a step for elimination of the acid gases contained in the effluent from step f) with one or more chemical or physical solvents, used alone or as a mixture,
h) a step for final purification over at least one guard bed in order to adsorb traces of impurities remaining in the synthesis gas obtained from step g), such as $H_2S$, COS, HCN and $NH_3$, i) a catalytic Fischer-Tropsch synthesis reaction step carried out on the effluent obtained from step h).

In a variation of the process of the invention, the pre-treatment step comprises a granulation operation a3) carried out after the torrefaction operation a2) and before the grinding operation a4). In another variation, said granulation operation a3) is carried out before the torrefaction operation a2).

In a variation of the process of the invention, the effluent obtained from step e) firstly undergoes a step k) for elimination of heavy metals over at least one suitable guard bed.

Advantageously in accordance with the process of the invention, at least one fraction of the effluent obtained from water gas shift step d3) is sent to the catalytic hydrolysis step d4) as a mixture with said complementary portion.

In accordance with the process of the invention, said other fraction of feed advantageously comprises at least one fraction of hydrocarbon feed.

In accordance with the process of the invention, the Fischer-Tropsch synthesis step i) is advantageously followed by a step j) for hydrotreatment and/or isomerization of the hydrocarbon cuts obtained from step i).

The present invention also concerns a facility for carrying out the process of the invention, which comprises:
- at least one unit (a) for pre-treatment of the feed, comprising a drying unit, a torrefaction unit, optionally a granulation unit, and a grinding unit;
- optionally, a combination unit comprising a line (b) for combining the effluents obtained from the various pre-treatment units;
- a unit (c) for gasification of the pre-treated effluents comprising at least one entrained flow reactor;
- a unit for conditioning synthesis gas, comprising:
  - a unit for scrubbing with water and for fractionation of the gas stream in order to divide the stream of synthesis gas into at least two effluents;
  - at least one guard bed for eliminating halogenated compounds on one of said two effluents located upstream of a water gas shift unit;
  - a catalytic hydrolysis unit;
  - a unit (e) for recombination of the effluents obtained respectively from the water gas shift unit and the catalytic hydrolysis unit;
  - a unit for scrubbing the effluent obtained from the synthesis gas conditioning unit with water;
  - a unit for eliminating the acid gases contained in the scrubbed effluent;
  - a unit for final purification of the scrubbed and deacidified effluent, comprising at least one guard bed;
  - a catalytic Fischer-Tropsch synthesis reaction unit.

The facility of the invention advantageously further comprises at least one unit for hydrotreatment and/or isomerization of the hydrocarbon cuts obtained from the catalytic Fischer-Tropsch synthesis reaction unit.

DETAILED DESCRIPTION OF THE INVENTION

Types of Feeds

Figure 1:
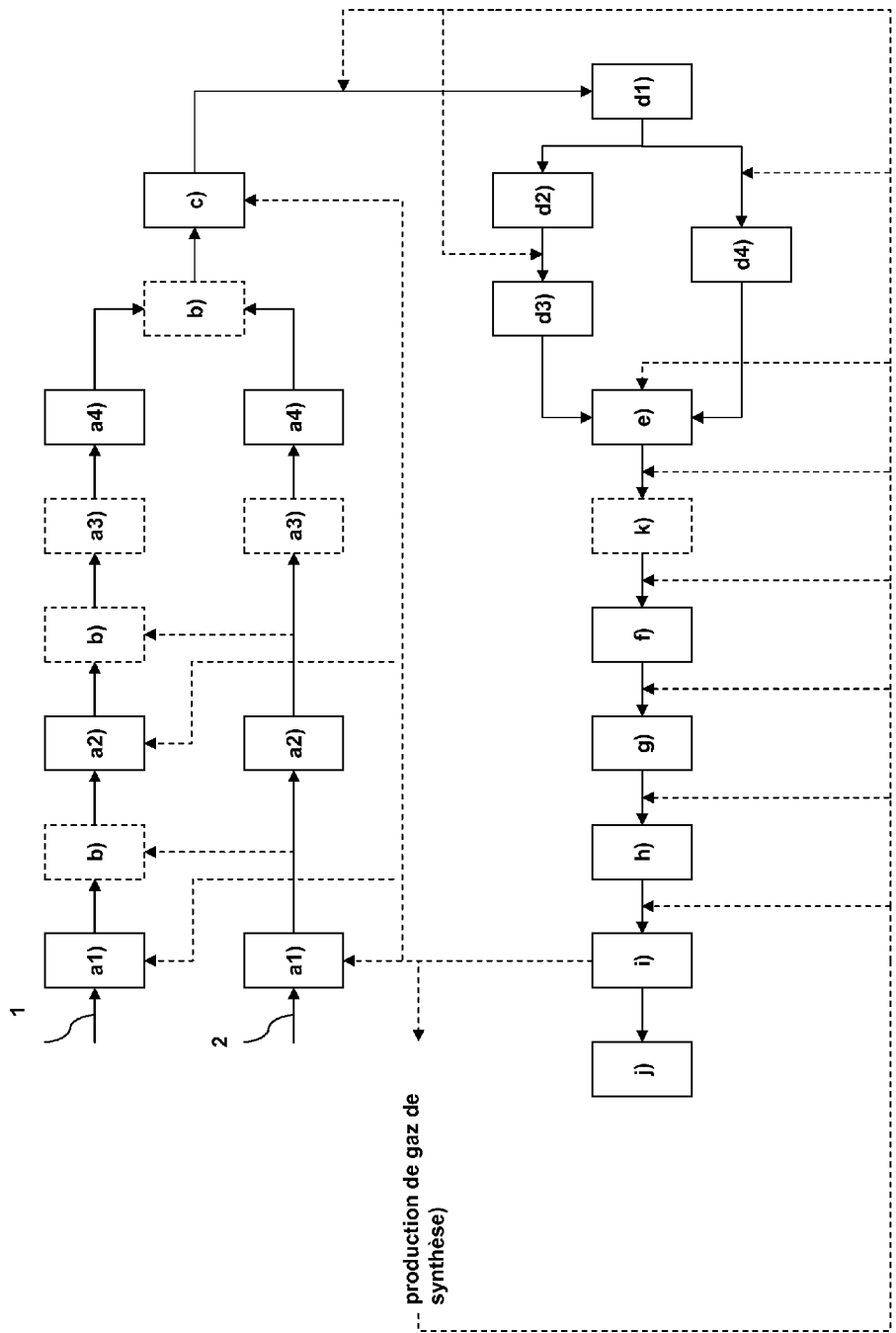
FIG. 1 describes a first variation of the process in which the effluents obtained from units d3) and d4) are directly recombined in step e).

The process of the invention is carried out for a feed comprising at least one fraction of biomass and optionally at least one fraction of another feed. In the context of the invention, the term "biomass" means any type of biomass, preferably solid type biomass, in particular lignocellulosic type biomass. Non-limiting examples of types of biomass concern, for example, residues from agricultural exploitation (in particular straw, corn cobs), residues from forestry exploitation, products from forestry exploitation, sawmill residues, and dedicated cultivation, for example short rotation coppice.

The feed for the process of the invention may also comprise at least one fraction of another feed, preferably at least one fraction of a gaseous, solid and/or liquid hydrocarbon feed (co-processing). Said hydrocarbon feed fraction, as the term is used in the context of the present invention, is understood to mean a fraction of feed which may advantageously contain at least coal, petcoke, natural gas, oil residues, crude oil, topped crude oil, deasphalted oil, deasphalted asphalt, derivatives from oil conversion processes (such as: HCO/FCC slurry, heavy GO/coking VGO, residue from visbreaking or similar thermal processes, etc., for example), bituminous sand or derivatives, shale gases and oil shale or their derivatives, liquid biomass (such as: rapeseed oil, palm oil, pyrolysis oil, etc., for example), and slurried biomass, corresponding to a mixture of liquid biomass with a solid hydrocarbon feed. In accordance with the process of the invention, said hydrocarbon feed fraction may be a fraction of a gaseous, solid, liquid or mixed hydrocarbon feed.

The feed for the process of the invention may thus be a feed comprising at least one fraction of solid biomass and optionally at least one fraction of another gaseous, solid or liquid feed, alone or as a mixture.

In general, the feed used in the process of the invention comprises at least 20%, preferably at least 50%, preferably at least 70%, and more preferably at least 90% of biomass fraction.

The various steps of the process of the invention are described below.

a) Feed Pre-Treatment Step

Step a) of the invention for pre-treatment of the feed comprises at least one of the operations of drying a1), torrefaction a2), optional granulation a3), and grinding a4) as described below. The feed introduced into the process of the invention may also be pre-conditioned before said pre-treatment step, for example by means of a step which can disrupt the biomass in order to incorporate them more readily into the operations of drying a1) or torrefaction a2) or granulation a3) or grinding a4). When the fraction of hydrocarbon feed is a fraction of gaseous or liquid hydrocarbon feed, this is advantageously introduced directly into the gasification step c) without undergoing the pre-treatment step a).

a1) Drying Operation

Step a) for pre-treatment of the feed of the invention comprises a first operation a1) for drying the feed advantageously carried out at a temperature in the range 20° C. to 180° C., preferably in the range 60° C. to 160° C. and preferably in the range 100° C. to 140° C., for a period in the range 5 to 180 minutes, preferably in the range 15 to 60 minutes. At the inlet to the drying operation a1), the feed generally comprises a water content in the range 15% to 80% by weight. The residual water content in the feed at the end of the drying operation is advantageously less than 25% by weight, preferably less than 15% by weight and more preferably less than 10% by weight. The drying operation may be carried out using any means known to the skilled person.

In a variation of the process of the invention, the drying operation a1) is carried out at least in part with the aid of the energy supplied by combustion of natural gas.

In another variation of the process of the invention, the drying operation a1) is carried out at least in part with the aid of the energy from combustion of the gaseous fraction obtained from the torrefaction operation a2), thus allowing the consumption of natural gas in the process to be reduced.

In another variation of the process of the invention, the drying operation a1) is carried out at least in part with the aid of the combustion energy of the gaseous fraction obtained from the Fischer-Tropsch synthesis step i), thus allowing the consumption of natural gas in the process to be reduced.

In an advantageous configuration, it is possible to combine at least two of the three variations described above.

a2) Torrefaction Operation

The operation for drying the feed of the invention is followed by an operation for torrefaction, a2), carried out in a torrefaction furnace which produces a more friable feed effluent, and as a consequence requires less energy for fine grinding. The torrefaction operation is advantageously carried out at a temperature in the range 220° C. to 350° C., preferably in the range 250° C. to 320° C. and more preferably in the range 270° C. to 300° C., for a period in the range 5 to 180 minutes, preferably in the range 15 to 60 minutes, at an absolute operating pressure which is preferably in the range 0.1 to 15 bar, preferably in the range 0.1 to 10 bar and more preferably in the range 0.5 to 1.5 bar (1 bar=0.1 MPa). The torrefaction operation is carried out in an environment in which the oxygen content is advantageously less than 10% by volume, preferably less than 8% by volume and preferably less than 3% by volume.

The torrefaction operation has the advantage of reducing the energy cost of the grinding operation a4) and is accompanied by a loss of dry matter in the range 5% to 40% by weight, preferably in the range 10% to 35% by weight. However, this loss of dry matter is accompanied by a loss of calorific power which is much more limited, of the order of 5% to 20%. In this regard, the torrefaction operation can be used to increase the energy density of the biomass, i.e. its energy per unit volume.

The torrefaction operation also results in the production of gas containing water, acids such as acetic and formic acid, aldehydes such as furfural, alcohols (methanol, etc.), CO and $CO_2$. Thus, in a variation of the process of the invention, these gases are fed into a combustion chamber where they are burned in the presence of air and optionally in the presence of natural gas. Said combustion chamber may be independent of the torrefaction furnace. In accordance with the invention, the energy of the gases obtained from said combustion chamber may be recycled to heat the torrefaction furnace. In another variation of the process of the invention, thermal integration with the drying unit is carried out. In an advantageous configuration, the gaseous fraction obtained from the Fischer-Tropsch synthesis step i) could be at least partially used as a fuel in said combustion chamber. The energy integrations mentioned above may be carried out by any means or technique known to the skilled person.

a3) Optional Granulation Operation

In accordance with the process of the invention, the pre-treatment step may comprise a granulation operation a3), preferably carried out after the torrefaction operation a2) and before the grinding operation a4). In the case of straw or grassy material, the granulation operation a3) is advantageously carried out before the torrefaction operation a2). The granulation operation a3) is intended to place the feed into the form of granules with a homogenized size and shape and with an increased apparent density. This operation can be used to facilitate any transport of this feed as well as its manipulation in the remainder of the process.

Preferably, grinding integrated with the granulation operation a3) can be used to obtain particles with a diameter which is less than the diameter of the granule, preferably below a third of the diameter of the granule, in order to promote cohesion of the particles during the granulation operation. By way of example, the granulation can be used to increase the apparent density from 200 $kg/m^3$ in the case of particles of wood to approximately 600 $kg/m^3$ in the case of granules of wood.

a4) Grinding Operation

The grinding operation a4) of the process of the invention is carried out under conditions allowing the feed to be reduced to particles with a dimension suitable for treatment in an entrained flow gasification unit (step c). At the end of the grinding operation a4), 90% of the particles of the feed preferably have an equivalent diameter of less than 300 microns and 90% of the particles of the feed preferably have an equivalent diameter of more than 1 micron; preferably, 90% of the particles of the feed have an equivalent diameter of less than 200 microns and 90% of the particles of feed have an equivalent diameter of more than 5 microns; and more preferably, 90% of the particles of feed have an equivalent diameter of less than 100 microns and 90% of the particles of feed have an equivalent diameter of more than 10 microns. The equivalent diameter, denoted $d_e$, is defined by the following relationship, for example:

$$d_e = 6 \cdot \frac{V}{S}$$

where
  V is the volume of the particle,
  S is the surface area of the sphere with the same volume as the particle.

b) Optional Combination Step b)

In the case in which the feed for the process of the invention further comprises at least a fraction of another feed, preferably a fraction of hydrocarbon feed, this latter may be pre-treated in at least one of operations a1), a2), a3) and a4), irrespective of the order in which the operations a1), a2), a3) and a4) are carried out.

In one embodiment of the process, the operations a1), a2), a3) and a4) are carried out in succession.

In another embodiment of the process of the invention, said other fraction of feed is not pre-treated.

In a variation, said other fraction of feed, preferably a fraction of hydrocarbon feed, is pre-treated in operations a1) and a4).

The operations a1), a2), a3) and a4) of the pre-treatment step for said other fraction of feed, preferably a fraction of hydrocarbon feed, may or may not be common with the operations a1), a2), a3) and a4) for pre-treatment of the biomass fraction.

In the case in which the biomass fraction is pre-treated separately from the hydrocarbon feed fraction, i.e. in distinct units, the process comprises a step b) for combination of the pre-treated feed effluents. Said combination step b) may be interposed at various stages of the feed pre-treatment process, depending on the different variations of the process of the invention.

In a variation of the process of the invention, the fraction of biomass and the fraction of hydrocarbon feed are separately dried (a1), torrefied (a2), optionally granulated (a3) and ground (a4) and combined (b) after grinding (a4), before the gasification step c).

In another variation of the process of the invention, the fraction of biomass and the fraction of hydrocarbon feed are separately dried (a1) and combined (b) before torrefaction (a2). In such a case, the torrefaction operation is carried out on the effluent obtained from the combination step b).

In another variation of the process of the invention, the biomass fraction and the hydrocarbon feed fraction are separately dried (a1), torrefied (a2) and combined (b) before the grinding operation (a4).

In another variation of the process of the invention, the biomass fraction and the hydrocarbon feed fraction are separately dried (a1), the biomass fraction is then torrefied (a2), then the dried hydrocarbon feed fraction and the dried and torrefied biomass fraction are combined (b) before the grinding operation (a4).

In another variation of the process of the invention, at least three of the four operations a1), a2), a3) and a4) for pre-treating the feed of the invention may be carried out at the same time, preferably in the same treatment unit.

The combination step b) has the advantage of homogenizing the feed directed towards the gasifier, of having a quantity of energy per unit time which is stable and constant and of maximizing the carbon conversion in the gasification step c).

c) Gasification Step c)

In accordance with the process of the invention, step a) for pre-treatment of the feed or feeds, optionally followed by the combination step b), is followed by a gasification step c).

The gasification step employs a partial oxidation reaction which converts the feed into a synthesis gas mainly comprising carbon monoxide and hydrogen. The gasification step is advantageously operated in the presence of a programmed quantity of oxygen in the form of a stream the flow rate of which is controlled and containing at least 90% by volume of oxygen, preferably at least 96% by volume of oxygen.

Step c) for gasification of the feed is carried out in a fixed bed type or fluidized bed gasifier or, as is preferred, in an entrained flow cooled wall high temperature gasifier, i.e. at a temperature in the range 800° C. to 1800° C., preferably in the range 1000° C. to 1600° C. and more preferably in the range 1200° C. to 1500° C., and at an absolute pressure which is advantageously in the range 20 to 120 bar, preferably in the range 25 to 60 bar, ad more preferably in the range 30 to 50 bar. The high temperature means that a high carbon conversion can be obtained, and thus the quantity of unconverted carbon in the ash produced can be reduced, and thus the quantity of ash recycled to the gasifier can also be reduced.

Depending on whether the feed is in the solid, liquid or gaseous state, the mode of introduction into step c) may vary. For solid feeds, a stream of gas, for example $CO_2$ or nitrogen, preferably $CO_2$, is advantageously added to the feed to bring about its pneumatic transport and to compress said feed in the gasifier. In the case of liquid or slurry feeds, these are introduced into the gasifier by means of pumps. Gaseous feeds are compressed to a pressure above that of the gasifier in order for them to be able to be injected into the gasification chamber.

The entrained flow gasifier is preferably a gasifier which is known to the skilled person as a cooled wall entrained flow gasifier. The cooled wall defines the gasification chamber which is itself located in the gasifier. The water used for cooling the wall of the gasification chamber moves in a coil placed outside the wall of the gasification chamber. The water is partially vaporized, thereby generating a medium pressure flow of steam. This cooling of the walls means that a layer of protective ash can be formed on the inner wall of the gasification chamber. In fact, the feeds introduced into the gasifier contain inorganic compounds which form ash after gasification. At the gasification temperature, the liquid ash, in the form of droplets, solidify when they encounter the cooled wall and form a solid layer acting as an insulator. Thus, thermal protection of the wall of the gasification chamber is provided on the one hand by a layer of solidified ash and on the other hand by a layer of molten ash in contact with the gas phase, flowing towards the bottom of the gasifier. The wall of the combustion chamber is thus highly resistant to high temperatures and to large variations in temperature. In addition, because of their composition, in particular their high alkaline compound content, the ash obtained from the biomass has a corrosive nature for refractory type coatings. As a consequence, gasification technologies using internal refractories to protect the walls are difficult to operate because they deteriorate rapidly, which necessitates rapid renewal. In addition, the refractories are highly sensitive to thermal shocks which destroy this protective layer by fracturing.

In the cooled wall entrained flow gasifier, at least two burners, preferably four burners or more depending on the capacity of the gasifier, are disposed in the gasification chamber, the walls of which are cooled, and which functions at a temperature sufficient to allow fusion of the ash contained in the feed. Further, the feeds introduced into the gasifier may have very different properties. As an example, the lower heating value (LHV) of a biomass is lower than that of a petcoke, and so the quantity of ash of a biomass may be much lower than that of a coal and the melting point of the ash may vary greatly from one biomass to another. Thus, the melting point of the ash may vary depending on the composition of the feed introduced into the gasification chamber. Similarly, the minimum gasification temperature for being above the melting point of the ash may be adjusted by adjusting the nature of feeds with different properties, and the proportions of the various constituents (other biomass, other hydrocarbon feed, etc.) and/or by injection of a flux (for example lime) with the feed.

In a preferred version of the invention, the synthesis gas produced in the gasification chamber leaves it as a co-current with the liquid ash flowing towards the bottom of the gasifier. This co-current configuration has the advantage over a configuration in which the synthesis gas is evacuated from the gasifier chamber towards the top while the liquid ash flows towards the bottom, of avoiding the risk of clogging the liquid ash evacuation line. In fact, liquid ash flowing alone in the line may, depending on its viscosity, flow with difficulty and/or partially solidify, partially or completely obstructing the evacuation line and resulting in stoppage of the facility for maintenance. These phenomena may in particular occur during transitional phases when temperatures are raised or lowered, or during adjustments linked to a change in the nature of the feed. The configuration of the invention has the advantage that the gas flowing as a co-current with the liquid ash in the evacuation line from the gasification chamber facilitates the flow of this ash towards the bottom of the gasifier and avoids the risk of clogging even in the transitional phases.

In a preferred version of the invention, the synthesis gas and the liquid ash pass into an intensive liquid quench zone in contact with at least one film of water, as described in patent application DE 102007044726. This quench zone is positioned below the gasification chamber and separates a hot dry zone at the top from a colder moist zone at the bottom. The hot dry zone located below the gasification chamber is characterized by the presence of synthesis gas and liquid ash flowing towards the bottom of the gasifier. The colder moist portion is located below the hot dry zone and is characterized by the presence of synthesis gas saturated with water, solidified ash and liquid water. The temperature of the synthesis gas at the outlet from the cold moist zone corresponds to the temperature of the thermodynamic equilibrium between the gas phase and the liquid phase at the operating pressure of the gasifier.

This configuration with a quench has the dual advantage of on the one hand saturating the synthesis gas with water, the operation necessary in the water gas shift reaction step d3); on the other hand, this configuration allows the fine adhesive particles of ash entrained during scrubbing of the synthesis gas to be eliminated, thus reducing the risks of fouling in the pipework and the downstream units. Further, the high temperature in the gasification chamber means that the molten ash can flow easily towards the bottom on the wall thereof before falling into the quench zone. After being passed into the cold moist unit, the cooled ash ends up in the bottom of the water-filled gasifier. In contact with the water, this molten ash is immediately cooled and vitrified into dense particles. These particles are then extracted from the gasifier in the form of a mixture of water and solid ash (or slurry) by decompression. The major portion of the mineral compounds contained in the feed forms molten ash. This configuration can advantageously be used to encapsulate dangerous products such as heavy metals in the vitrified ash. The vitrification process renders this ash more stable and it cannot be leached out.

In an alternative version of the invention, the synthesis gas produced leaves the gasification chamber from the top, while the molten ash flows along the wall as a counter-current to the synthesis gas until it reaches the bottom of the water-filled gasifier. In contact with the water, the molten ash rapidly solidifies, forming particles of small dimensions. These particles are then extracted from the gasifier in the form of slurry (mixture of water and solid ash) by decompression. Since the major portion of the mineral compounds contained in the feed forms molten ash, this configuration can advantageously encapsulate dangerous products such as heavy metals in the vitrified ash. The vitrification process renders this ash highly stable and it cannot be leached out. Said synthesis gas leaving the gasification chamber via the top and the finer particles of molten ash entrained with it are cooled by a stream of cooled synthesis gas which is depleted in solid particles. This cooling means that the molten ash can be solidified into solid, non-adhesive particles. After this first preliminary cooling step, the synthesis gas is directed towards a heat exchanger to produce steam. In order to eliminate the fine solid particles, the synthesis gas then passes through a section for separating the gas phase and the solid phase using any technique which is known to the skilled person, for example cartridge filters. A portion of this cooled synthesis gas which is depleted in particles is recycled to the outlet from the gasifier to cool the synthesis gas leaving from the head of the gasifier.

d) Step d) for Conditioning Synthesis Gas

In accordance with the process of the invention the synthesis gas obtained from the gasification step c) undergoes a conditioning step d). The synthesis gas obtained from gasification step c) is mainly composed of carbon monoxide (CO), hydrogen ($H_2$), carbon dioxide ($CO_2$), and water ($H_2O$) and comprises impurities initially deriving from the biomass fraction and/or from the fraction of another feed, in particular a hydrocarbon feed. These impurities are essentially metals, in particular alkalis (Na, K), sulphur-containing compounds, as well as chlorine-containing compounds and nitrogen-containing compounds. In particular, the quantity of halogenated compounds initially present in the feed of the invention may be as much as at least 250 ppm by weight in the unrefined hydrocarbon feed fraction (before drying), and at least 10000 ppm by weight in the case of the unrefined biomass fraction (before drying).

Step d1) for Scrubbing with Water and Fractionation of Synthesis Gas

Thus, in accordance with the invention, the synthesis gas obtained from gasification step c) advantageously undergoes a step d1) for scrubbing with water to eliminate traces of solid in the synthesis gas, as well as a portion of the gaseous compounds which are soluble in water. This operation may be carried out using any type of technique which is known to the skilled person, including a venturi scrubber, a scrubbing column with any type of internal fitting, etc.

At the outlet from the water scrubbing step, the synthesis gas undergoes a step for fractionation into at least two effluents, a first portion and a complementary portion, on which the following steps are carried out:

a step d2) for elimination of the halogenated compounds by passing said first portion through at least one suitable guard bed;

a water gas shift step d3) carried out on the effluent obtained from step d2);

a step d4) for catalytic hydrolysis of the compounds COS and HCN contained in said complementary portion of the effluent obtained from step d1) to form $H_2S$ and $NH_3$.

The Applicant has observed that fractionation of the effluent obtained from step d1) into at least two effluents which are treated separately means that the costs linked to the size of the treatment units and the quantity of catalysts employed can be considerably reduced. The absence of a step for fractionation of the synthesis gas stream would require gas treatment steps which would then involve the whole of the stream of effluent obtained from step d1). In this latter case, the step for catalytic hydrolysis of COS and HCN would, for example, be carried out on the whole of the gas stream, but the quantity of catalyst to be used is determined by the quantity of gas to be treated. However, the fractionation of the effluent can be used to obtain separate effluents with lower flow rates (sum of the dry gas flow rates being at most equal to the total dry gas flow rate before fractionation). More particularly, in the process of the invention, only the complementary portion not undergoing the water gas shift step undergoes a step for catalytic hydrolysis of COS and HCN. The complementary portion undergoing the step for hydrolysis of COS and HCN is considerably reduced, and so this means that the size of the unit as well as the quantity of catalyst necessary for carrying out said hydrolysis step can be considerably reduced in proportion.

More generally, the effluents termed the first portion and the complementary portion obtained from step d1) for scrubbing with water and fractionation of synthesis gas undergo distinct treatment steps. The first portion undergoes a step d2) for elimination of halogenated compounds and a water gas shift step d3); while the complementary portion undergoes a step d4) for catalytic hydrolysis of the COS and HCN compounds to form $H_2S$ and $NH_3$. Fractionation of the synthesis gas as well as the distinct and separate treatment of the effluents means that the size of the units and the quantities of catalysts employed in said units can be reduced.

In accordance with the process of the invention, the respective proportions of said first portion of effluent obtained from step d1) and said complementary portion are advantageously determined in order to obtain an effluent leaving step h) which supplies the Fischer-Tropsch step i) with a $H_2/CO$ ratio which is advantageously in the range 0.5 to 4, preferably in the range 1 to 3, more preferably in the range 1.5 to 2.5.

In general, said first portion of the effluent obtained from step d1) is at least in the range 20% to 80% by volume, preferably in the range 30% to 70% by volume, more preferably in the range 40% to 60% by volume of the total effluent of the synthesis gas obtained from step d1).

Step d2) for Elimination of Halogenated Compounds

In accordance with the process of the invention, a step d2) for elimination of halogenated compounds over at least one guard bed is carried out on the first portion of the effluent obtained from step d1). Step d2) can be used to substantially eliminate the halogenated compounds, advantageously chlorine, contained in said first portion of the effluent before the latter is sent to a water gas shift unit (step d3). The technology of the fixed bed reactor will advantageously be such as to promote capture of the halogenated compounds, in particular the chlorine contained in the synthesis gas of said first portion, with the aid of capture masses which are known to the skilled person. Advantageously, step d2) is carried out on at least one guard bed in the presence of a capture mass containing an active zeolite type and/or zinc oxide and/or basic oxide phase such as an alumina. The active phase may be doped or promoted by one or more compounds of alkali and/or alkaline-earth and/or rare earth elements. The active phase may, for example, be an alumina promoted by a sodium compound, for example by $Na_2O$. In the context of the invention, passing the first portion of the effluent obtained from step d1) through at least one guard bed means that the specifications required for the water gas shift unit d3) can be complied with. At the outlet from the halogenated compound elimination step d2), the effluent generally contains less than 10 ppm by volume of chlorine, advantageously less than 5 ppm by volume of chlorine, preferably in the range 0.1 ppm to 5 ppm by volume of chlorine, more preferably in the range 1 ppm to 3 ppm by volume of chlorine, and still more preferably in the range 1 ppm to 2 ppm by volume of chlorine.

Water Gas Shift Step d3)

Step c) of the invention for gasification of the feed as carried out in the present invention may result in the production of hydrogen and carbon monoxide in a $H_2/CO$ molar ratio which is not optimal for the Fischer-Tropsch reaction, particularly when the catalyst used is a catalyst based on cobalt which advantageously requires an optimal $H_2/CO$ molar ratio of approximately 2 so that it can be orientated towards the production of middle distillates.

In order to obtain the $H_2/CO$ molar ratio required for the Fischer-Tropsch synthesis, in accordance with the invention, the effluent obtained from step d2) for elimination of halogenated compounds is directed towards a water gas shift section d3) in order to produce a stream of gas which is rich in hydrogen and depleted in carbon monoxide.

The water gas shift reaction step d3) is advantageously carried out at an inlet temperature close to the temperature of the synthesis gas obtained from the step for scrubbing with water and fractionation d1) in order to reduce the energy consumption over the whole of the biomass upgrade line. Preferably, step d3) is carried out at an inlet temperature in the range 150° C. to 280° C., preferably in the range 200° C. to 280° C.

Advantageously, the water gas shift reaction step d3) is carried out at an absolute pressure in the range 20 to 120 bar, preferably in the range 25 to 60 bar, and more preferably in the range 30 to 50 bar; at an hourly space velocity HSV (volume of feed/volume of catalyst/hour) in the range 1000 to 10000 $h^{-1}$, preferably in the range 1000 to 9000 $h^{-1}$ and more preferably in the range 1500 to 8500 $h^{-1}$, and at a temperature in the range 150° C. to 550° C., preferably in the range 200° C. to 550° C., and more preferably in the range 250° C. to 500° C.

The catalyst used in this step d3) is a catalyst comprising at least one element from group VIII and/or at least one element from group VIB of the periodic classification of the elements (group VIII corresponds to groups 8, 9 and 10 and group VIB to group 6 in the new notation of the periodic classification of the elements: Handbook of Chemistry and Physics, $81^{st}$ edition, 2000-2001). Preferably, the catalyst is a catalyst comprising sulphurized cobalt and/or sulphurized molybdenum. The catalyst support is usually a porous solid selected from the group constituted by aluminas, silica and silica-aluminas. Preferably, the catalyst support is alumina. The catalyst used may be promoted with an alkali or alkaline-earth promoter. The water gas shift reaction can be used to considerably increase the quantity of hydrogen in the effluent directed towards the Fischer-Tropsch synthesis step i).

If necessary, water in the liquid form, preferably in the form of steam and preferentially in the form of superheated steam, may be added upstream of the water gas shift step in order to adjust the $H_2O/CO$ ratio at the inlet to the unit for step d3). Advantageously, step d3) is carried out with a $H_2O/CO$ ratio in the range 0.5 to 100, preferably in the range 0.5 to 25, more preferably in the range 1.5 to 10. Because of the exothermic nature of the water gas shift reaction, the gaseous effluent obtained from this step has a temperature in the range 250° C. to 550° C. This gaseous effluent is advantageously cooled to the operating temperature of the hydrolysis unit, between 100° C. and 400° C., preferably between 200° C. and 350° C. This cooling is advantageously carried out by generating steam which could be used either in the process line of the invention, or to produce electricity.

In a variation of the process of the invention, the $H_2/CO$ molar ratio of the stream of gas entering Fischer-Tropsch synthesis step i) may be adjusted to its optimal level of approximately 2 in order to be orientated towards the production of middle distillates by adding an external stream of gas which is rich in hydrogen produced by any means known to the skilled person, including: electrolysis of water, steam reforming of natural gas followed by a step for pressure swing adsorption (PSA) separation, or by temperature swing adsorption (TSA), or by membrane separation. This stream of gas which is rich in hydrogen may be injected at any point of the line located downstream of the gasification step c) and can be used to reduce the size of the water gas shift step d3).

In a variation of the process of the invention, a portion of the gas obtained from the water gas shift step d3) but also optionally from upstream or downstream of said step d3) may advantageously be sent to a unit for the production of hydrogen carried out by any means known to the skilled person, preferably by pressure swing adsorption (PSA) separation, or by temperature swing adsorption (TSA), or by membrane separation. The hydrogen produced is advantageously used in step j) for hydrotreatment and/or isomerization.

Step d4) for Catalytic Hydrolysis of the Compounds COS and HCN

In accordance with the process of the invention, the complementary portion obtained from step d1) undergoes a step for catalytic hydrolysis of COS and HCN to $H_2S$ and $NH_3$ (step d4). This step can be used to eliminate COS and HCN, which are poisons for the Fischer-Tropsch synthesis catalyst. The step for catalytic hydrolysis of carbon oxysulphide (COS) and hydrogen cyanide (HCN) is advantageously carried out in accordance with the invention in the presence of a catalyst containing a compound based on platinum or an oxide of an element selected from the group comprising titanium, zirconium, aluminium, chromium and zinc, or a mixture thereof.

Preferably, the hydrolysis catalyst is a catalyst based on titanium oxide. The catalyst used may also contain at least alkali metals, alkaline-earth metals and/or rare earths obtained, for example, from precursors such as potassium hydroxide, zirconium oxide, sodium or barium carbonate, sodium or barium bicarbonate, calcium sulphate, sodium or barium acetate, or sodium or barium oxalate. The hydrolysis step is advantageously carried out at a temperature in the range 100° C. to 400° C., preferably in the range 200° C. to 350° C. Advantageously, the effluent at the outlet from the hydrolysis unit of step d4) contains less than 25 ppm by volume of COS and less than 5 ppm by volume of HCN, preferably less than 10 ppm by volume of COS and less than 1 ppm by volume of HCN, and more preferably less than 5 ppm by volume of COS and less than 0.1 ppm by volume of HCN.

In a variation of the process of the invention, at least a portion of the effluent obtained from the water gas shift step d3) is sent as a mixture with said complementary portion to the step for catalytic hydrolysis of COS and HCN to form $H_2S$ and $NH_3$ (step d4). Advantageously, the effluent obtained from the water gas shift step d3) is sent to the catalytic hydrolysis step (step d4) as a mixture with said complementary portion after cooling to a temperature which is preferentially in the range 100° C. to 400° C., preferably in the range 200° C. to 350° C.

Preferably, the proportion of the effluent obtained from step d3) sent as a mixture with said complementary portion is in the range 20% to 90% by volume, preferably in the range 40% to 80% by volume, more preferably in the range 50% to 70% by volume.

e) Recombination Step e)

In accordance with the process of the invention, at least a fraction of the effluent obtained from the water gas shift step d3) is recombined in step e) with at least a portion of the effluent obtained from the catalytic hydrolysis step d4).

f) Step f) for Scrubbing the Recombined Effluent with Water

The effluent obtained from recombination step e) is then advantageously scrubbed with water (step f). Step f) has the advantage of eliminating impurities such as $NH_3$ and HCl which are soluble in the water and are particularly harmful to the operation of step g), namely elimination of the acid gases.

In a variation of the process of the invention, the effluent obtained from step e) initially undergoes a step k) for eliminating heavy metals over at least one suitable guard bed.

Step k) can be used to substantially eliminate heavy metals such as lead, arsenic and mercury before the effluent is treated in water scrubbing step f) and more particularly before step g) for eliminating acid gases. The technology of the fixed bed reactor advantageously promotes capture of the heavy metals contained in the synthesis gas with the aid of capture masses known to the skilled person. Advantageously, step k) is carried out on at least one or more guard beds in the presence of one or more capture masses containing one or more active phases. Advantageously, said active phases contain at least one sulphur compound, for example, such as supported elemental sulphur and/or a metallic sulphide such as a copper and/or zinc sulphide, and at least one precious metal such as silver, gold or palladium, and/or a silver-exchanged zeolite and/or transition metal oxides such as copper or nickel oxides, for example. Advantageously, said active phase or phases are supported, for example on an alumina, a silica, a silica-alumina or an activated carbon.

In the context of the invention, passage of the effluent through at least one guard bed of step k) means that the required specifications at the inlet to the acid gas elimination section (step g) can be complied with, along with the specifications required for the Fischer-Tropsch synthesis unit i).

In a second variation of the invention, step k) for eliminating heavy metals is carried out between water scrubbing step f) and acid gas elimination step g).

In a third variation of the invention, step k) for eliminating heavy metals is carried out after step g) for eliminating acid gases when the solvent used in step g) is a chemical solvent derived from alkanolamine which, as the skilled person is aware, is less sensitive than physical solvents to the presence of heavy metals.

At the outlet from step k) for eliminating heavy metals, the effluent contains a quantity which is generally less than 1 ppb by volume of lead, arsenic and mercury, preferably less than 0.5 ppb by volume, more preferably less than 0.1 ppb by volume and still more preferably less than 0.01 ppb by volume of lead, arsenic and mercury.

g) Step g) for Elimination of Acid Gases

Step g) of the invention is dedicated to eliminating acid gases such as sulphur-containing compounds ($H_2S$) or $CO_2$ remaining in the synthesis gas obtained from step f). Step g) is carried out by using chemical or physical solvents or a mixture of chemical and physical solvents, or indeed any means known to the skilled person. The chemical solvent may, for example, be a primary, secondary or tertiary amine derived from alkanolamine such as monoethanolamine (MEA), diethanolamine (DEA) or methyldiethanolamine (MDEA). The physical solvent may, for example, be based on mixtures of polyethylene glycol diethylether (PEG) such as PEG diethylether or dibutylether, or methanol.

The step for eliminating acid gases is, for example, carried out using a column for adsorbing the acid gases which depends on the chemical or physical solvent used, followed by a step for regeneration of the solvent in order to reduce the consumption of solvent in the unit. This regeneration step may advantageously be carried out in two steps in order to eliminate, on the one hand, a stream of gas which is rich in $CO_2$ and on the other hand, a stream of gas which is rich in $H_2S$. In a variation of the process of the invention, said stream which is rich in $CO_2$ is purified of $H_2S$ and advantageously recycled to gasification step c).

h) Final Purification Step h)

The catalyst based on cobalt used in Fischer-Tropsch synthesis step i) is highly sensitive to impurities present in the synthesis gas, which are only present in quantities of the order of ppb (parts per billion). At the outlet from step g), the synthesis gas may still contain impurities in small quantities of approximately 100 ppb by volume of $H_2S$ and COS.

In accordance with the process of the invention, a step h) for final purification is carried out over at least one guard bed in order to completely adsorb the last traces of impurities remaining in the synthesis gas, such as halogenated compounds, $H_2S$, COS, HCN and $NH_3$. The final purification step is carried out using any means which is known to the skilled person, by way of example over at least one guard bed based on zinc oxide ZnO, Cu/ZnO, or activated carbon, and can be used to reach the required specifications in terms of impurities in the synthesis gas employed in Fischer-Tropsch synthesis step i).

Advantageously, at the outlet from step h), the synthesis gas has a sulphur content of less than 100 ppb by volume, preferably less than 50 ppb by volume, more preferably less than 10 ppb by volume; a HCN content of less than 100 ppb by volume, preferably less than 50 ppb by volume, more preferably less than 10 ppb by volume, and a $NH_3$ content of less than 100 ppm by volume, preferably less than 10 ppm by volume, more preferably less than 1 ppm by volume.

i) Catalytic Fischer-Tropsch Synthesis Reaction Step i)

In accordance with the process of the invention, Fischer-Tropsch synthesis step i) of the process is carried out starting from a supply comprising the effluent obtained from step h) and permits the production of a stream comprising liquid synthesis hydrocarbons and at least one gaseous effluent. Advantageously, the supply to the Fischer-Tropsch synthesis step i) comprises carbon monoxide and hydrogen with a $H_2/CO$ molar ratio in the range 0.5 to 4, preferably in the range 1 to 3, more preferably in the range 1.5 to 2.5.

Fischer-Tropsch synthesis step i) is carried out in a reaction unit comprising one or more suitable reactors the technology of which is familiar to the skilled person. It may, for example, be multitube fixed bed reactors or slurry bubble column reactors, or microchannel reactors.

In a preferred embodiment of the invention, step i) takes place in one or more slurry bubble column reactors. The synthesis is highly exothermic, and so this embodiment can, inter alia, be used to improve the thermal control of the reactor and generate smaller pressure drops.

The catalyst employed in this Fischer-Tropsch synthesis step i) is generally any catalytic solid known to the skilled person which can be used to carry out Fischer-Tropsch synthesis. Preferably, the catalyst used in said step comprises cobalt or iron, more preferably cobalt. The catalyst used in step i) is generally a supported catalyst. The support may, for example, be based on alumina, silica or titanium.

The temperature and pressure conditions are variable and are adapted to the catalyst used in this step i). The absolute pressure is generally in the range 10 to 60 bar, preferably in the range 15 to 35 bar and preferentially in the range 20 to 30 bar. The temperature may generally be in the range 170° C. to 280° C., preferably in the range 190° C. to 260° C. and preferentially in the range 210° C. to 240° C.

In a variation of the process of the invention, at least one gaseous fraction obtained from the Fischer-Tropsch synthesis (step i) is advantageously recycled to gasification step c) in order to be converted into synthesis gas and thus improve the mass yield of the process line.

In another configuration of the process of the invention, at least a portion of the gaseous fraction obtained from the Fischer-Tropsch synthesis i) is advantageously sent to an independent unit for the production of synthesis gas (for example POx: Partial oxidation, SMR: Steam Methane Reforming, ATR: Autothermal Reforming, EHTR.: Enhanced Heat Transfer Reformer, etc.); this synthesis gas may be recycled to any point of the line between the outlet from step c) and step i).

In another configuration of the process of the invention, at least a portion of the gaseous fraction obtained from step i) may supply the energy for the drying operations a1) and/or the torrefaction operations a2) in order to maximize the energy efficiency of the process line.

In another configuration of the process of the invention, the gaseous fraction obtained from step i) can be used to produce electricity in a combined cycle which may be supplied in part by steam produced in steps c), d3) and i) in order to increase the energy efficiency of the process line.

These various configurations can advantageously be combined so as to optimize the economics of the integrated process line of the invention.

j) Hydrotreatment and/or Isomerization Step j)

In accordance with the process of the invention, step i) is advantageously followed by a step j) for hydrotreatment and/or isomerization of the hydrocarbon cuts obtained from step i). Step j) is carried out under the usual operating conditions familiar to the skilled person and is intended to upgrade the hydrocarbon cuts obtained from step i) by producing liquid hydrocarbons, in particular liquid biofuels, namely very high quality bio-naphtha, bio-gasoline, bio-kerosene, bio-diesel and lubricant bases.

One possible option is the production of paraffin cuts, base products for petrochemical processes, for example production of a $C_{10}$-$C_{13}$ cut intended for the production of (bio) LAB (Linear Alkyl Benzene) or (bio) waxes for various industrial applications.

DESCRIPTION OF THE FIGURES

FIG. 1 represents the general layout of the process of the invention in the embodiment in which the effluents obtained from units d3) and d4) are recombined directly in step e).

Figure 2:
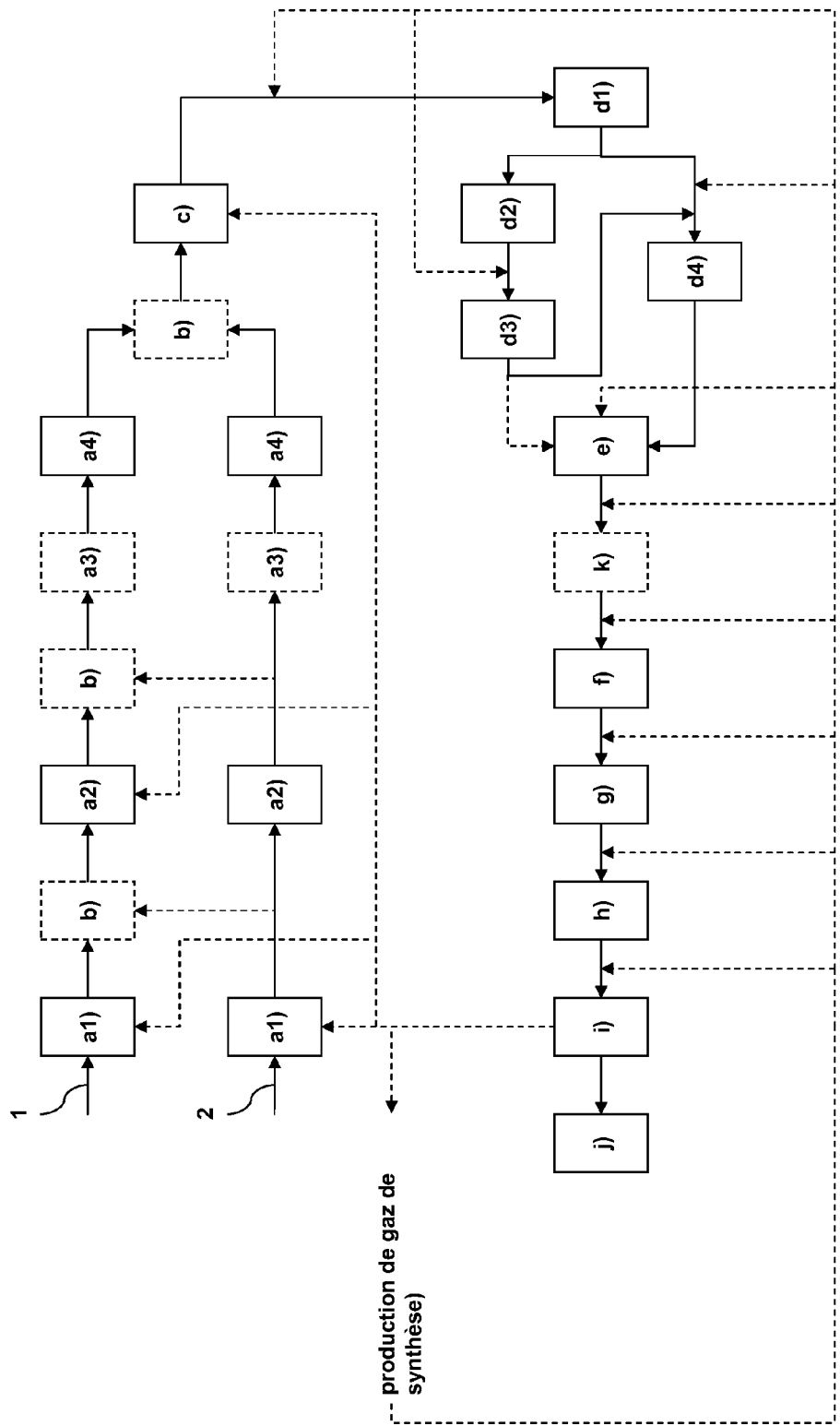
FIG. 2 describes a second variation of the process in which at least a portion of the effluent obtained from unit d3) is sent as a mixture with the complementary portion obtained from step d1) for scrubbing with water and fractionation of the synthesis gas, to unit d4).

FIG. 2 represents the general layout of the process of the invention, in another embodiment in which at least a portion of the effluent obtained from the unit d3) is sent to the unit d4) as a mixture with the complementary portion.

Other advantages, details and characteristics of the invention will become apparent from the description of the two embodiments illustrated in FIGS. 1 and 2. These embodiments are given by way of example and are not in any way limiting in nature. This illustration of the process of the invention does not include all of the components necessary for carrying it out. Only those elements necessary for understanding the invention are shown here; the skilled person will be capable of completing this representation in order to carry out the invention.

In FIGS. 1 and 2, a biomass feed and a hydrocarbon feed are sent separately via channel (1) and channel (2) to the drying units a1). At the outlet from units a1), the dried feeds are then torrefied in torrefaction units a2) before optionally being sent to the granulation units a3) then to the grinding units a4) then optionally combined in unit b). The step b) for combination may be carried out at the outlet from the drying steps a1) for the biomass feed and the hydrocarbon feed or at the outlet from the torrefaction steps a2) for the two feeds (shown as a dashed line).

The pre-treated feeds combined in the unit b) are then sent to the gasification unit c). The pre-treated feed is combined in the presence of a stream containing at least 90% by volume of oxygen (not shown) and under pressure and temperature conditions as described above in the description.

The synthesis gas obtained from the reactor for unit c), purified of the majority of the particles of ash or dust and a portion of the water-soluble elements, is advantageously sent to the water scrubbing unit d1), then is fractionated into two effluents. A first portion of the synthesis gas is sent to a unit d2) comprising at least one guard bed suitable for eliminating halogenated compounds, in particular chlorine. The synthesis gas obtained from the unit d2) is then sent directly to the unit d3) in which it undergoes the water gas shift reaction under the operating conditions described above. At the same time, the complementary portion of the synthesis gas effluent obtained from the unit d1) is sent to the unit d4) in which said synthesis gas undergoes a reaction for the catalytic hydrolysis of COS and HCN to form $H_2S$ and $NH_3$ under operating conditions as described in the description. In the variation described in FIG. 2, the complementary portion is sent to the unit d4) as a mixture with at least a portion of the effluent obtained from the water gas shift unit d3). The effluents obtained from units d3) and d4) are recombined in the unit e).

At the outlet from the unit e), the effluent is sent to the unit f) in which it undergoes water scrubbing to eliminate soluble impurities such as $NH_3$ and HCl therefrom. Said effluent obtained from step e) advantageously firstly undergoes a step k) for eliminating heavy metals over at least one suitable guard bed (represented as a dashed line in FIGS. 1 and 2). The scrubbed effluent obtained from step f) is then channeled towards the unit g) for elimination of acid gases by a chemical or physical solvent. The effluent obtained from unit g) is then sent to the unit h) in which it is purified of the last remaining traces such as halogens, $H_2S$, COS, HCN and $NH_3$ by passage through at least one guard bed based on zinc oxide.

The purified effluent obtained from unit h) is then sent to the catalytic Fischer-Tropsch synthesis reaction unit i) under conditions as described in the description. The hydrocarbon cuts produced at the end of the catalytic Fischer-Tropsch synthesis reaction carried out in unit i) are then sent to a unit j) in which they are upgraded by carrying out hydrotreatment and/or isomerization steps. The gaseous fraction obtained from unit i) (shown as a dashed line in FIGS. 1 and 2) could at least in part supply energy to the drying operations a1) and/or the torrefaction operations a2) to maximize the energy efficiency of the line.

A portion of said gaseous fraction may also be recycled to the gasification unit c) in order to be converted into synthesis gas and thus to improve the mass yield of the line (shown as a dashed line in FIGS. 1 and 2). A portion of said gaseous fraction may be sent to an independent unit for the production of synthesis gas (not shown); this synthesis gas could be recycled to any point in the line between the outlet from step c) and step i) (shown as a dashed line in FIGS. 1 and 2).

EXAMPLES

Catalyst C1

Catalyst C1 was an industrial catalyst based on cobalt and molybdenum. This industrial catalyst had a metallic cobalt content of 2.2% by weight and a metallic molybdenum content of 8.3% by weight. Its specific surface area, determined by the BET method, was 196 $m^2/g$. This catalyst was used in its sulphurized form in water gas shift step d3). The catalyst was in the form of extrudates approximately 3 mm in diameter.

Activation of Catalyst C1

Catalyst C1 was sulphurized at a temperature of 500° C. (5° C./min ramp-up) for two hours and under an absolute pressure of 26 bar with a gas containing 15% by volume of hydrogen sulphide and 85% by volume of hydrogen. The degree of sulphurization of the molybdenum, determined by X ray photoelectron spectroscopy (XPS), was 92%.

Example 1

Treatment of a Feed in Accordance with the Process of the Invention

Starting from bottles of gas with known concentrations, a model feed was constructed; its composition was representative of an industrial feed at the inlet to unit d3) after carrying out step d2). The properties of this feed are given in Table 1.

TABLE 1

| Properties of the feed | | |
|---|---|---|
| Properties | Unit | Value |
| $H_2$/CO ratio | [mol/mol] | 0.6 |
| $H_2O$/CO ratio | [mol/mol] | 2.0 |
| Quantity of inerts | [% vol] | 66 |
| Quantity of $H_2S$ | [% vol] | 0.4 |

This feed was injected into a fixed bed reactor charged with catalyst C1. The operating conditions which were selected were as follows:

an hourly space velocity HSV (volume of feed/volume of catalyst/hour)=8100 $h^{-1}$ absolute operating pressure: 26 bar catalytic bed inlet temperature: 270° C.

temperature of catalytic bed: 330° C.

The flow rates of the gases entering the unit d3) were adjusted at the start of the experimental test. During this test on the unit, the composition of the gases at the outlet from the unit was analyzed continuously. This analytical monitoring meant that the carbon monoxide conversion could be determined over time. The experimental results are shown in FIG. 3.

Figure 3:
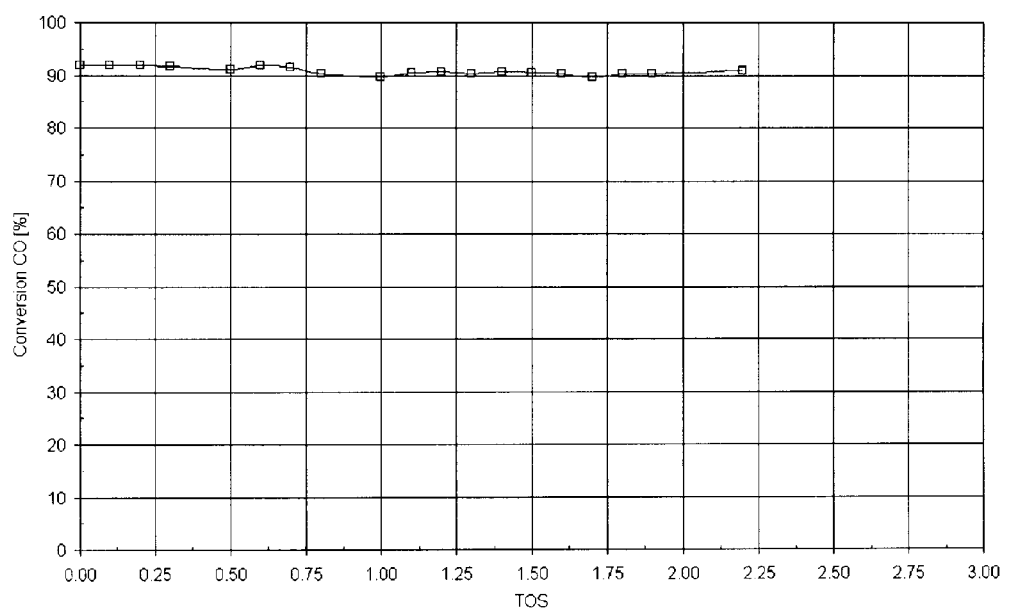
FIG. 3 graphically shows the conversion of carbon monoxide as a function of operating time (TOS) for Example 1.

According to FIG. 3, the performances obtained over time varied only slightly. The carbon monoxide conversion was constant at approximately 90% throughout the period of the test.

Example 2

Treatment of a Chlorine-Containing Feed not Treated in Step d2) (not in Accordance with the Invention)

A model feed was simulated from the standard gas in order to obtain a composition representative of an industrial feed at the inlet to the water gas shift unit which had not undergone a step d2) for eliminating halogenated compounds. The properties of this feed are given in Table 2.

TABLE 2

Properties of the feed

| Properties | Unit | Value |
|---|---|---|
| $H_2/CO$ ratio | [mol/mol] | 0.6 |
| $H_2O/CO$ ratio | [mol/mol] | 2.0 |
| Quantity of inerts | [% vol] | 66 |
| Quantity of $H_2S$ | [% vol] | 0.4 |
| Quantity of HCl | [ppm vol] | 50 |

This model synthesis gas was injected into a fixed bed reactor charged with catalyst C1. The operating conditions which were selected were as follows:
hourly space velocity HSV (volume of feed/volume of catalyst/hour)=8100 $h^{-1}$
absolute operating pressure: 26 bar
catalytic bed inlet temperature: 270° C.
temperature of catalytic bed: 330° C.

The flow rates of the gases entering the unit were adjusted at the start of the experimental test. During this test on the unit, the composition of the gases at the outlet from the unit was analyzed continuously. This analytical monitoring meant that the carbon monoxide conversion could be determined over time. The experimental results are shown in FIG. 4.

Figure 4:
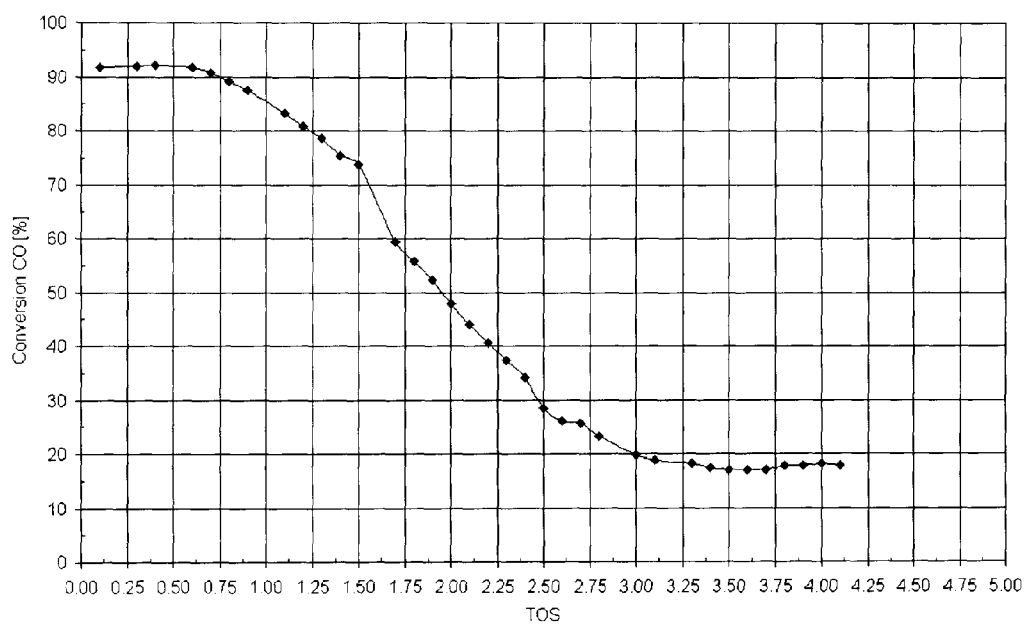
FIG. 4 graphically shows the conversion of carbon monoxide as a function of operating time (TOS) for Example 2.

According to FIG. 4, after a latent period, the carbon monoxide conversion reduced very rapidly and reached values close to 20% following injection of chlorine into the feed.

Injection of HCl into the model feed was halted. We then observed that the conversion of carbon monoxide, calculated from the chromatographic analysis of the gases leaving the unit, rose again and stabilized at approximately 50%. The operating conditions remained unchanged. The experimental results are shown in FIG. 5.

Figure 5:
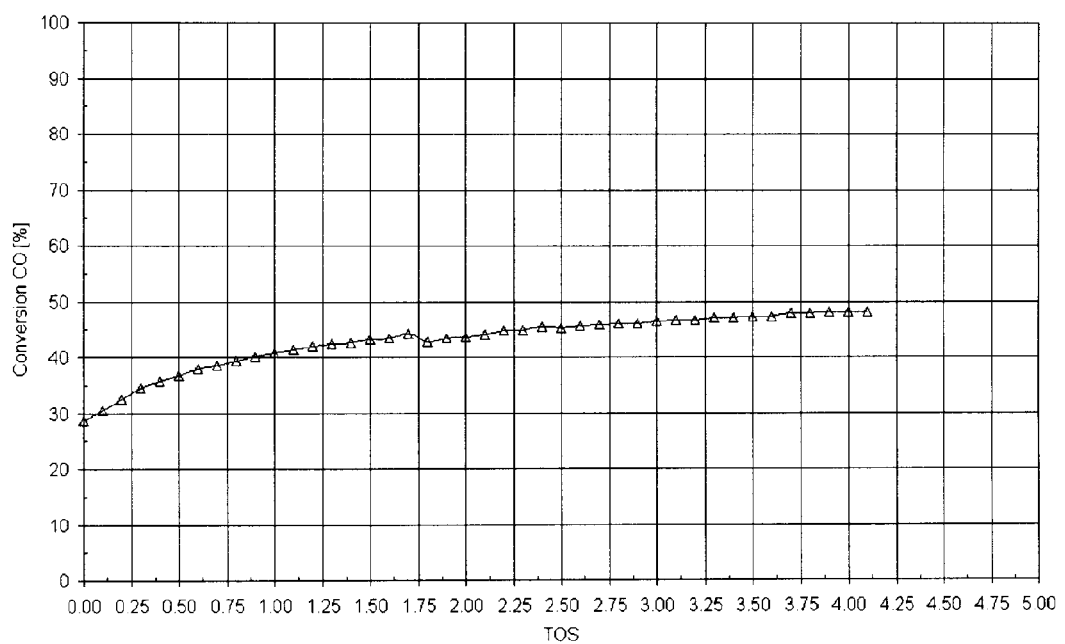
FIG. 5 graphically shows the conversion of carbon monoxide as a function of operating time (TOS) after stopping chlorine injection for Example 2.

According to the results of FIG. 5, the carbon monoxide conversion with a feed containing no more chlorine reached a plateau at approximately 50% conversion. The water gas shift catalyst C1 thus did not recover its initial performance of approximately 90%, which illustrates the partially irreversible nature of poisoning with chlorine.

Example 3

Process for the Production and Treatment of Synthesis Gas in Accordance with the Process of the Invention Example 3, which was in accordance with the invention, was carried out using a portion of the process concatenation described in FIG. 1.

Flow rate of gas to be treated (flow at inlet to step d1): 100 $Nm^3/h$,

Flow rate of gas towards step d2) (effluent obtained from fractionation step d1): first portion): 51.2 $Nm^3/h$, Flow rate of gas towards step d4) (effluent obtained from fractionation step d1): complementary portion): 48.8 $Nm^3/h$.

Step d2) for the Elimination of Halogenated Compounds

The capture mass M1 used was an industrial solid based on alumina promoted by $Na_2O$. The solid M1 had a 95% by weight alumina content and a 5% by weight $Na_2O$ content. Its specific surface area, determined by the BET method, was 200 $m^2/g$. The solid was in the form of extrudates approximately 3 mm in diameter. This solid was used in step d2) for eliminating halogenated compounds.

The gaseous feed with the composition described in Table 3 (effluent obtained from step d1) was injected into a fixed bed reactor charged with solid M1. The operating conditions which were selected were as follows:
hourly space velocity HSV (volume of feed/volume of capture mass/hour)=200 $h^{-1}$
absolute operating pressure: 26 bar
temperature of bed: 250° C.

Analysis and monitoring at the reactor outlet meant that the HCl content in the stream of treated gas could be determined. The experimental results are given in Table 3 (composition of effluent obtained from step d2).

Water Gas Shift Step d3)

The catalyst C1 which was used was an industrial catalyst based on cobalt and molybdenum. This industrial catalyst had a metallic cobalt content of 2.2% by weight and a metallic molybdenum content of 8.3% by weight. Its specific surface area, determined by the BET method, was 196 $m^2/g$. This catalyst was used in its sulphurized form. The catalyst was in the form of extrudates approximately 3 mm in diameter.

The gaseous feed with the composition described in Table 3 (effluent obtained from step d2) was injected into a fixed bed reactor charged with catalyst C1. The operating conditions which were selected were as follows:
hourly space velocity HSV (volume of feed/volume of catalyst/hour)=3000 $h^{-1}$
absolute operating pressure: 26 bar
catalytic bed inlet temperature: 250° C.
temperature of catalytic bed: 350° C.

Analysis and monitoring at the reactor outlet meant that the carbon monoxide conversion could be determined. The experimental results are given in Table 3 (composition of effluent obtained from step d3).

Step d4) for Hydrolysis of COS and HCN

The catalyst C2 used was an industrial catalyst based on titanium oxide. This industrial catalyst had a titanium oxide content of 85% by weight. Its specific surface area, determined by the BET method, was 120 $m^2/g$. The catalyst was in the form of extrudates approximately 3 mm in diameter.

The gaseous feed with the composition described in Table 3 (complementary effluent obtained from step d1) was injected into a fixed bed reactor charged with catalyst C2. The operating conditions which were selected were as follows:
hourly space velocity HSV (volume of feed/volume of catalyst/hour)=1500 $h^{-1}$
absolute operating pressure: 26 bar
temperature of catalytic bed: 250° C.

Analysis and monitoring at the reactor outlet meant that the COS and HCN conversions could be determined. The experimental results are given in Table 3 (composition of effluent obtained from step d4).

The streams of gas obtained from steps d3) and d4) were recombined during the recombination step e) in order to obtain a mixture of gas with a $H_2/CO$ ratio equal to 2. The composition of the gaseous effluent obtained at the end of step e) is given in Table 4.

Step f) for Water Scrubbing of Recombined Effluent

The recombined effluent obtained from step e) was scrubbed with water before directly carrying out step g) for eliminating acid gases on said scrubbed recombined effluent.

Step g) for Eliminating Acid Gases

In accordance with the invention, the synthesis gas was purified by scrubbing with an aqueous amine solution to eliminate $CO_2$ and $H_2S$. The aqueous amine solution used was composed of 38% by weight of methyldiethanolamine (MDEA), 8% by weight of diethanolamine (DEA) and 54% by weight of water and was employed in the absorber under the following operating conditions:

temperature: 45° C.
pressure: 26 bar

The residual quantities of acidic compounds in the gas at the end of step g) for eliminating acid gases of the invention were: for $H_2S$, 1 ppm vol (vol=by volume); for $CO_2$, 10 ppm vol; for COS, 8 ppm vol; for HCN, 1 ppm vol; for HCl, 0.001 ppm vol.

A stream of steam was injected into the effluent gas at the end of step g). The composition of the gaseous effluent obtained at the end of step g) and after adding steam is given in Table 4.

Final Purification Step h)

The effluent obtained from acid gas elimination step g) underwent a step h) for final purification as described in document WO 2006/008317.

The final purification step h) comprised a residual COS and HCN hydrolysis reactor followed by a guard bed intended to trap the residual $H_2S$.

The COS and HCN hydrolysis was carried out with the aid of catalyst C2. The gaseous feed with the composition described in Table 4 (effluent obtained from step g) was injected into a fixed bed reactor charged with catalyst C2. The operating conditions which were selected were as follows:

hourly space velocity HSV (volume of feed/volume of catalyst/hour)=400 $h^{-1}$
absolute operating pressure: 26 bar
temperature of catalytic bed: 200° C.

A capture mass M2 containing 95% by weight of ZnO was disposed in a guard bed downstream of the hydrolysis reactor. The gaseous feed obtained from the hydrolysis unit was then injected into the guard bed containing the capture mass M2. The solid was in the form of extrudates approximately 3 mm in diameter. The operating conditions were as follows:

hourly space velocity HSV (volume of feed/volume of capture mass/hour)=300 $h^{-1}$
absolute operating pressure: 26 bar
temperature of catalytic bed: 200° C.

The synthesis gas obtained from final purification step h) contained 1 ppb by volume of $H_2S$, 1 ppb by volume of COS, 1 ppb by volume of HCN and 9 ppm by volume of $NH_3$.

The detailed composition of the gaseous effluent obtained at the end of step h) is given in Table 4.

TABLE 4

Composition of synthesis gases in the process.

| | Effluent obtained from recombination step e) | Effluent obtained from step g) | Effluent obtained from step h) |
|---|---|---|---|
| $H_2$ (% vol) | 27.4 | 63.4 | 63.4 |
| CO (% vol) | 13.6 | 31.5 | 31.5 |
| $CO_2$ (% vol) | 19.4 | 0.001 | 0.001 |
| $H_2O$ (% vol) | 37.4 | 1.0 | 1.0 |
| HCl (ppm vol) | 25 | 0.001 | 0.001 |
| $H_2S$ (ppm vol) | 4762 | 1 | 0.001 |
| COS (ppm vol) | 17 | 8 | 0.001 |
| HCN (ppm vol) | 1 | 1 | 0.001 |
| $NH_3$ (ppm vol) | 850 | 8 | 9 |
| $N_2$ (% vol) | 1.7 | 4.1 | 4.1 |
| $H_2$/CO | 2.0 | 2.0 | 2.0 |

Example 4

Process for the Production and Treatment of Synthesis Gas in Accordance with the Process of the Invention Example 4 in accordance with the invention, as was the case for Example 3, was carried out by employing part of the process concatenation described in FIG. 1. However, in Example 4, step g) for eliminating acid gases was carried out using an aqueous solution of methanol instead of the aqueous amine solution used in Example 3.

Flow rate of gas to be treated (flow at inlet to step d1): 100 $Nm^3/h$,

Flow rate of gas towards step d2) (effluent obtained from fractionation step d1): first portion): 51.2 $Nm^3/h$, Flow rate of gas towards step d4) (effluent obtained from fractionation step d1): complementary portion): 48.8 $Nm^3/h$.

Step d2) for the Elimination of Halogenated Compounds

The capture mass M1 used was an industrial solid based on alumina promoted by $Na_2O$. The solid M1 had a 95% by weight alumina content and a 5% by weight $Na_2O$ content. Its specific surface area, determined by the BET method, was 200 $m^2/g$. The solid was in the form of extrudates approximately 3 mm in diameter. This solid was used in step d2) for eliminating halogenated compounds.

The gaseous feed with the composition described in Table 5 (effluent obtained from step d1) was injected into a fixed bed reactor charged with solid M1. The operating conditions which were selected were as follows:

TABLE 3

Composition of synthesis gases in the process.

| | Flow of gas to be treated at inlet to d1) | Effluents obtained from fractionation step d1) | Effluent obtained from step d2) | Effluent obtained from step d3) | Effluent obtained from step d4) |
|---|---|---|---|---|---|
| $H_2$ (% vol) | 14.6 | 14.6 | 14.6 | 39.6 | 14.6 |
| CO (% vol) | 25.7 | 25.7 | 25.7 | 2.0 | 25.7 |
| $CO_2$ (% vol) | 6.6 | 6.6 | 6.6 | 31.5 | 6.6 |
| $H_2O$ (% vol) | 50.8 | 50.8 | 50.8 | 24.6 | 50.8 |
| HCl (ppm vol) | 50 | 50 | 1 | 1 | 50 |
| $H_2S$ (ppm vol) | 4300 | 4300 | 4300 | 4750 | 4775 |
| COS (ppm vol) | 480 | 480 | 480 | 30 | 3 |
| HCN (ppm vol) | 200 | 200 | 200 | 1 | 1 |
| $NH_3$ (ppm vol) | 650 | 650 | 650 | 850 | 850 |
| $N_2$ (% vol) | 1.7 | 1.7 | 1.7 | 1.7 | 1.7 |
| $H_2$/CO | 0.6 | 0.6 | 0.6 | 19.8 | 0.6 | hourly space velocity HSV (volume of feed/volume of capture mass/hour)=200 h$^{-1}$ absolute operating pressure: 26 bar temperature of bed: 250° C.

Analysis and monitoring at the reactor outlet meant that the HCl content in the stream of treated gas could be determined. The experimental results are given in Table 5 (composition of effluent obtained from step d2).

Water Gas Shift Step d3)

The catalyst C1 which was used was an industrial catalyst based on cobalt and molybdenum. This industrial catalyst had a metallic cobalt content of 2.2% by weight and a metallic molybdenum content of 8.3% by weight. Its specific surface area, determined by the BET method, was 196 m$^2$/g. This catalyst was used in its sulphurized form. The catalyst was in the form of extrudates approximately 3 mm in diameter.

The gaseous feed with the composition described in Table 5 (effluent obtained from step d2) was injected into a fixed bed reactor charged with catalyst C1. The operating conditions which were selected were as follows:

hourly space velocity HSV (volume of feed/volume of catalyst/hour)=3000 h$^{-1}$ absolute operating pressure: 26 bar catalytic bed inlet temperature: 250° C.

temperature of catalytic bed: 350° C.

Analysis and monitoring at the reactor outlet meant that the carbon monoxide conversion could be determined. The experimental results are given in Table 5 (composition of effluent obtained from step d3).

Step d4) for Hydrolysis of COS and HCN

The catalyst C2 used was an industrial catalyst based on titanium oxide. This industrial catalyst had a titanium oxide content of 85% by weight. Its specific surface area, determined by the BET method, was 120 m$^2$/g. The catalyst was in the form of extrudates approximately 3 mm in diameter.

The gaseous feed with the composition described in Table 5 (complementary effluent obtained from step d1) was injected into a fixed bed reactor charged with catalyst C2. The operating conditions which were selected were as follows:

hourly space velocity HSV (volume of feed/volume of catalyst/hour)=1500 h$^{-1}$ absolute operating pressure: 26 bar temperature of catalytic bed: 250° C.

Analysis and monitoring at the reactor outlet meant that the COS and HCN conversions could be determined. The experimental results are given in Table 5 (composition of effluent obtained from step d4).

The streams of gas obtained from steps d3) and d4) were recombined during the recombination step e) in order to obtain a mixture of gas with a H$_2$/CO ratio equal to 2. The composition of the gaseous effluent obtained at the end of step e) is given in Table 6.

Step f) for Water Scrubbing of Recombined Effluent

The recombined effluent obtained from step e) was scrubbed with water directly before operating step g) for eliminating acid gases on said scrubbed recombined effluent.

Step g) for Eliminating Acid Gases

In accordance with the invention, the synthesis gas was purified by scrubbing with an aqueous methanol solution to eliminate CO$_2$ and H$_2$S. The aqueous methanol solution used was composed of 95% by weight of methanol and 5% by weight of water and was employed in the absorber under the following operating conditions:

temperature: −40° C.

pressure: 26 bar

The residual quantities of acidic compounds in the gas at the end of step g) for eliminating acid gases of the invention were: for H$_2$S, 0.1 ppm vol (vol=by volume); for CO$_2$, 0.5% vol; for COS, 0.1 ppm vol; for HCN, 0.1 ppm vol; for HCl, 0.001 ppm vol.

A stream of steam was injected into the effluent gas at the end of step g). The composition of the gaseous effluent obtained at the end of step g) and after adding steam is given in Table 6.

Final Purification Step h)

The effluent obtained from acid gas elimination step g) underwent a step h) for final purification as described in document WO 2006/008317.

The final purification step h) comprised a residual COS and HCN hydrolysis reactor followed by a guard bed intended to trap the residual H$_2$S.

The COS and HCN hydrolysis was carried out with the aid of catalyst C2. The gaseous feed with the composition described in Table 6 (effluent obtained from step g) was injected into a fixed bed reactor charged with catalyst C2. The operating conditions which were selected were as follows:

hourly space velocity HSV (volume of feed/volume of catalyst/hour)=400 h$^{-1}$ absolute operating pressure: 26 bar temperature of catalytic bed: 200° C.

A capture mass M2 containing 95% by weight of ZnO was disposed in a guard bed downstream of the hydrolysis reactor. The gaseous feed obtained from the hydrolysis unit was then injected into the guard bed containing the capture mass M2. The solid was in the form of extrudates approximately 3 mm in diameter. The operating conditions were as follows:

hourly space velocity HSV (volume of feed/volume of capture mass/hour)=300 h$^{-1}$ absolute operating pressure: 26 bar temperature of catalytic bed: 200° C.

The synthesis gas obtained from final purification step h) contained 1 ppb by volume of H$_2$S, 1 ppb by volume of COS, 1 ppb by volume of HCN and 0.2 ppm by volume of NH$_3$.

The detailed composition of the gaseous effluent obtained at the end of step h) is given in Table 6.

TABLE 5

Composition of synthesis gases in the process.

| | Flow of gas to be treated at inlet to d1) | Effluents obtained from fractionation step d1) | Effluent obtained from step d2) | Effluent obtained from step d3) | Effluent obtained from step d4) |
|---|---|---|---|---|---|
| H$_2$ (% vol) | 14.6 | 14.6 | 14.6 | 39.6 | 14.6 |
| CO (% vol) | 25.7 | 25.7 | 25.7 | 2.0 | 25.7 |
| CO$_2$ (% vol) | 6.6 | 6.6 | 6.6 | 31.5 | 6.6 |

TABLE 5-continued

Composition of synthesis gases in the process.

| | Flow of gas to be treated at inlet to d1) | Effluents obtained from fractionation step d1) | Effluent obtained from step d2) | Effluent obtained from step d3) | Effluent obtained from step d4) |
|---|---|---|---|---|---|
| $H_2O$ (% vol) | 50.8 | 50.8 | 50.8 | 24.6 | 50.8 |
| HCl (ppm vol) | 50 | 50 | 1 | 1 | 50 |
| $H_2S$ (ppm vol) | 4300 | 4300 | 4300 | 4750 | 4775 |
| COS (ppm vol) | 480 | 480 | 480 | 30 | 3 |
| HCN (ppm vol) | 200 | 200 | 200 | 1 | 1 |
| $NH_3$ (ppm vol) | 650 | 650 | 650 | 850 | 850 |
| $N_2$ (% vol) | 1.7 | 1.7 | 1.7 | 1.7 | 1.7 |
| $H_2/CO$ | 0.6 | 0.6 | 0.6 | 19.8 | 0.6 |

TABLE 6

Composition of synthesis gases in the process.

| | Effluent obtained from recombination step e) | Effluent obtained from step g) | Effluent obtained from step h) |
|---|---|---|---|
| $H_2$ (% vol) | 27.4 | 62.8 | 62.8 |
| CO (% vol) | 13.6 | 31.2 | 31.2 |
| $CO_2$ (% vol) | 19.4 | 1.0 | 1.0 |
| $H_2O$ (% vol) | 37.4 | 1.0 | 1.0 |
| HCl (ppm vol) | 25 | 0.001 | 0.001 |
| $H_2S$ (ppm vol) | 4762 | 0.1 | 0.001 |
| COS (ppm vol) | 17 | 0.1 | 0.001 |
| HCN (ppm vol) | 1 | 0.1 | 0.001 |
| $NH_3$ (ppm vol) | 850 | 0.1 | 0.2 |
| $N_2$ (% vol) | 1.7 | 4.0 | 4.0 |
| $H_2/CO$ | 2.0 | 2.0 | 2.0 |

The invention claimed is:

1. An integrated process for the production of liquid hydrocarbons from a feed containing at least one fraction of biomass and optionally at least one fraction of another feed, said process comprising:
   a) pretreating said biomass fraction and optionally said at least one fraction of another feed comprising at least one of a1), a2), a4):
      a1) drying,
      a2) torrefaction,
      a4) grinding,
   b) optionally combining the resultant pre-treated biomass fraction and said at least one fraction of another feed which may or may not have been pre-treated,
   c) gasifying the resultant effluent obtained from b) and/or of the pre-treated fraction obtained from step a) and optionally of said at least one fraction of another feed introduced directly into gasification in an entrained flow reactor,
   d) conditioning a synthesis gas obtained from c), comprising:
      d1) scrubbing with water and fractionating said synthesis gas into at least two effluents: a first portion and a complementary portion,
      d2) eliminating halogenated compounds by passing said first portion through at least one suitable guard bed,
      d3) carrying out a water gas shift reaction on the effluent obtained from d2),
      d4) catalytic hydrolysis of COS and HCN compounds contained in said complementary portion from d1) into $H_2S$ and $NH_3$,
   e) recombining at least one fraction of each of the effluents obtained from d3) and d4),
   f) scrubbing the recombined effluent obtained from e) with water in order to eliminate impurities,
   g) eliminating acid gases $CO_2$ and $H_2S$ contained in the effluent from f) with one or more chemical or physical solvents, used alone or as a mixture,
   h) finally purifying the synthesis gas obtained from g) over at least one guard bed in order to adsorb traces of impurities,
   i) subjecting the effluent obtained from h) to a catalytic Fischer-Tropsch synthesis reaction.

2. The process according to claim 1, wherein said pretreating comprises a granulation operation a3) carried out after the torrefaction operation a2) and before the grinding operation a4).

3. The process according to claim 1, wherein said pretreating comprises a granulation operation a3) carried out before the torrefaction operation a2).

4. The process according to claim 1, wherein the effluent obtained from e) firstly undergoes elimination of heavy metals k) over at least one suitable guard bed.

5. The process according to claim 1, wherein at least one fraction of the effluent obtained from said water gas shift reaction d3) is sent to said catalytic hydrolysis d4) as a mixture with said complementary portion.

6. The process according to claim 1, wherein said feed comprises at least one hydrocarbon feed fraction.

7. The process according to claim 6, wherein said fraction of biomass and said fraction of hydrocarbon feed are dried (a1), torrefied (a2), optionally granulated (a3), and ground (a4) separately and combined (b) after grinding (a4).

8. The process according to claim 6, wherein said fraction of biomass and said fraction of hydrocarbon feed are dried (a1) separately and combined (b) before torrefaction (a2).

9. The process according to claim 6, wherein said fraction of biomass and said fraction of hydrocarbon feed are dried (a1) and torrefied (a2) separately and combined (b) before grinding (a4).

10. The process according to claim 1, wherein said catalytic Fischer-Tropsch synthesis reaction i) is followed hydrotreatment and/or isomerization j) of the hydrocarbon cuts obtained from i).

11. The process according to claim 1, wherein said drying a1) is carried out at a temperature in the range 20° C. to 180° C. for a period in the range 5 to 180 minutes.

12. The process according to claim 1, wherein said torrefaction a2) is carried out at a temperature in the range 220° C. to 350° C. for a period in the range 5 to 180 minutes at an absolute operating pressure in the range 0.1 to 15 bar.

13. The process according to claim 1, wherein said gasifying c) is carried out under temperature conditions in the range 800° C. to 1800° C. and absolute pressure conditions in the range 20 to 120 bar.

14. The process according to claim 1, wherein d2) is carried out over at least one guard bed in the presence of a capture mass containing an active zeolite type phase and/or zinc oxide and/or a basic oxide.

15. The process according to claim 1, wherein d3) is carried out in the presence of a catalyst comprising sulphurized cobalt and/or sulphurized molybdenum.

16. The process according to claim 1, wherein d4) is carried out at a temperature in the range 100° C. to 400° C. in the presence of a catalyst containing a platinum-based compound or an oxide of an element selected from titanium, zirconium, aluminum, chromium, zinc, and mixtures thereof.

17. The process according to claim 1, wherein h) is carried out over at least one guard bed based on zinc oxide, Cu/ZnO and activated carbon.

18. The process according to claim 1, wherein said catalytic Fischer-Tropsch synthesis reaction i) is carried out under temperature conditions in the range 170° C. to 280° C. and absolute pressure conditions in the range 10 to 60 bar, in the presence of a catalyst comprising cobalt or iron.

19. The process according to claim 15, wherein d3) is carried out in the presence of a catalyst comprising sulphurized cobalt and/or sulphurized molybdenum at an inlet temperature in the range 150° C. to 280° C.

\* \* \* \* \*